No. 658,463. Patented Sept. 25, 1900.
G. F. PFEIFFER.
FOLDING MACHINE.
(Application filed July 25, 1899.)
(No Model.) 5 Sheets—Sheet 4.
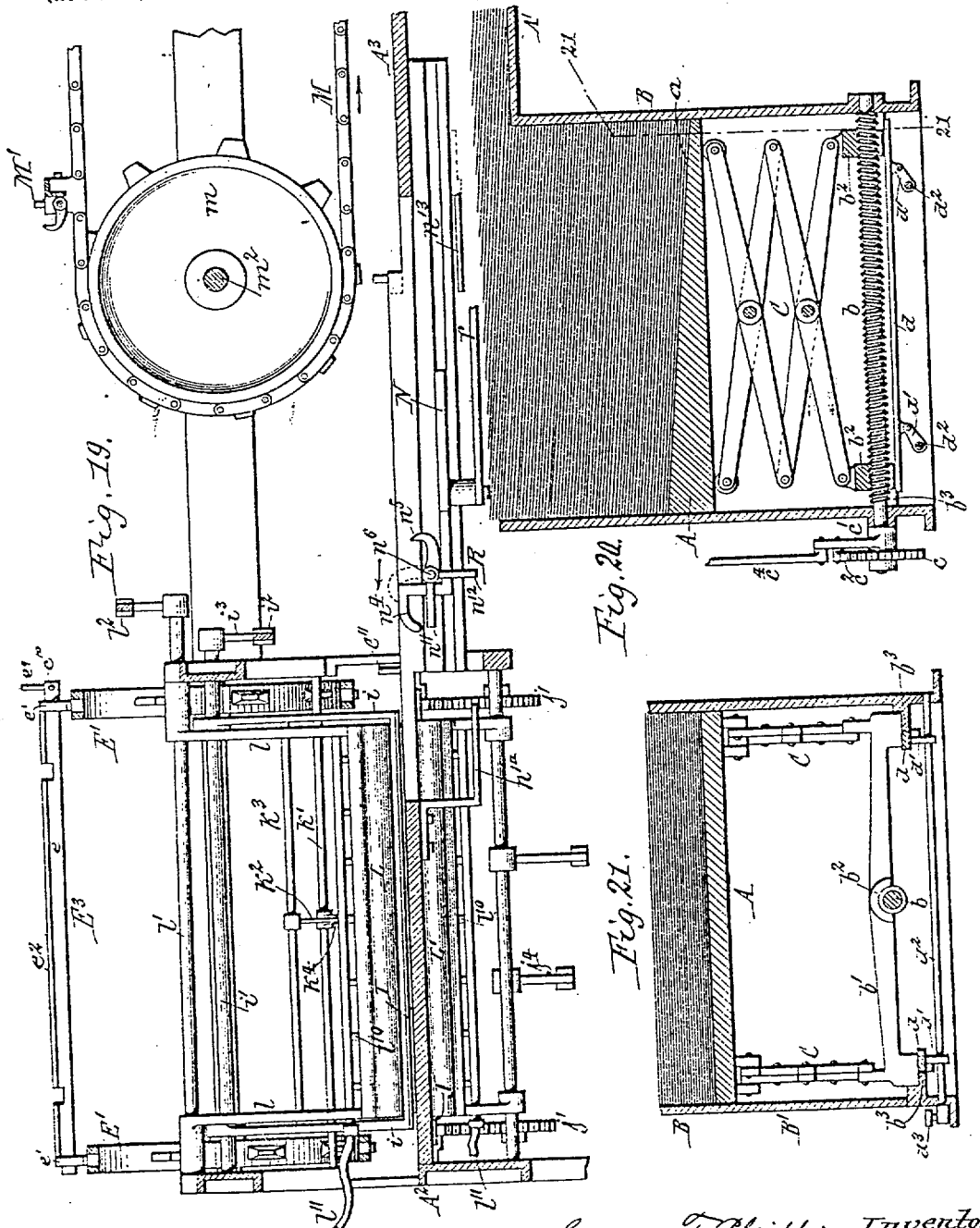

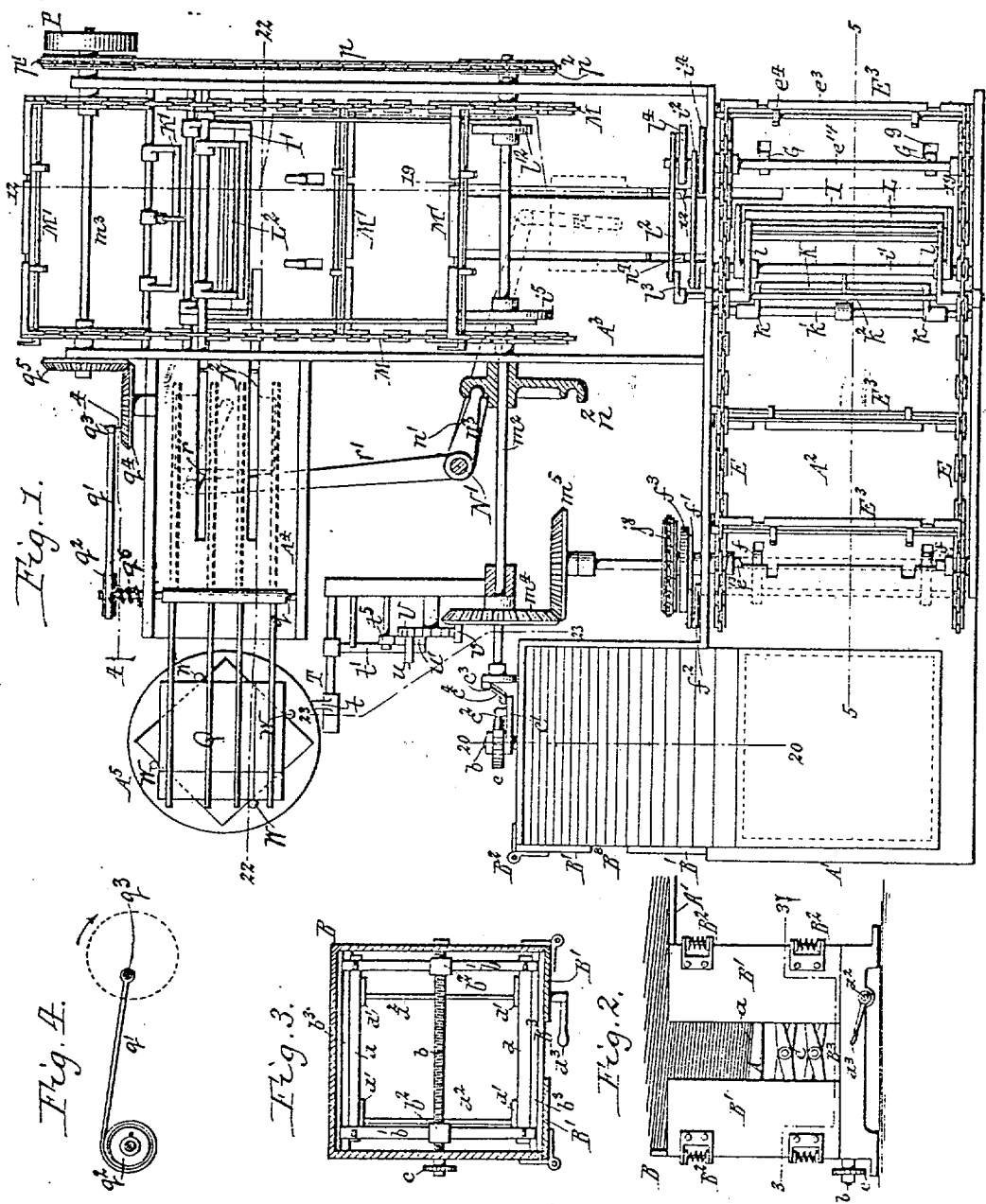

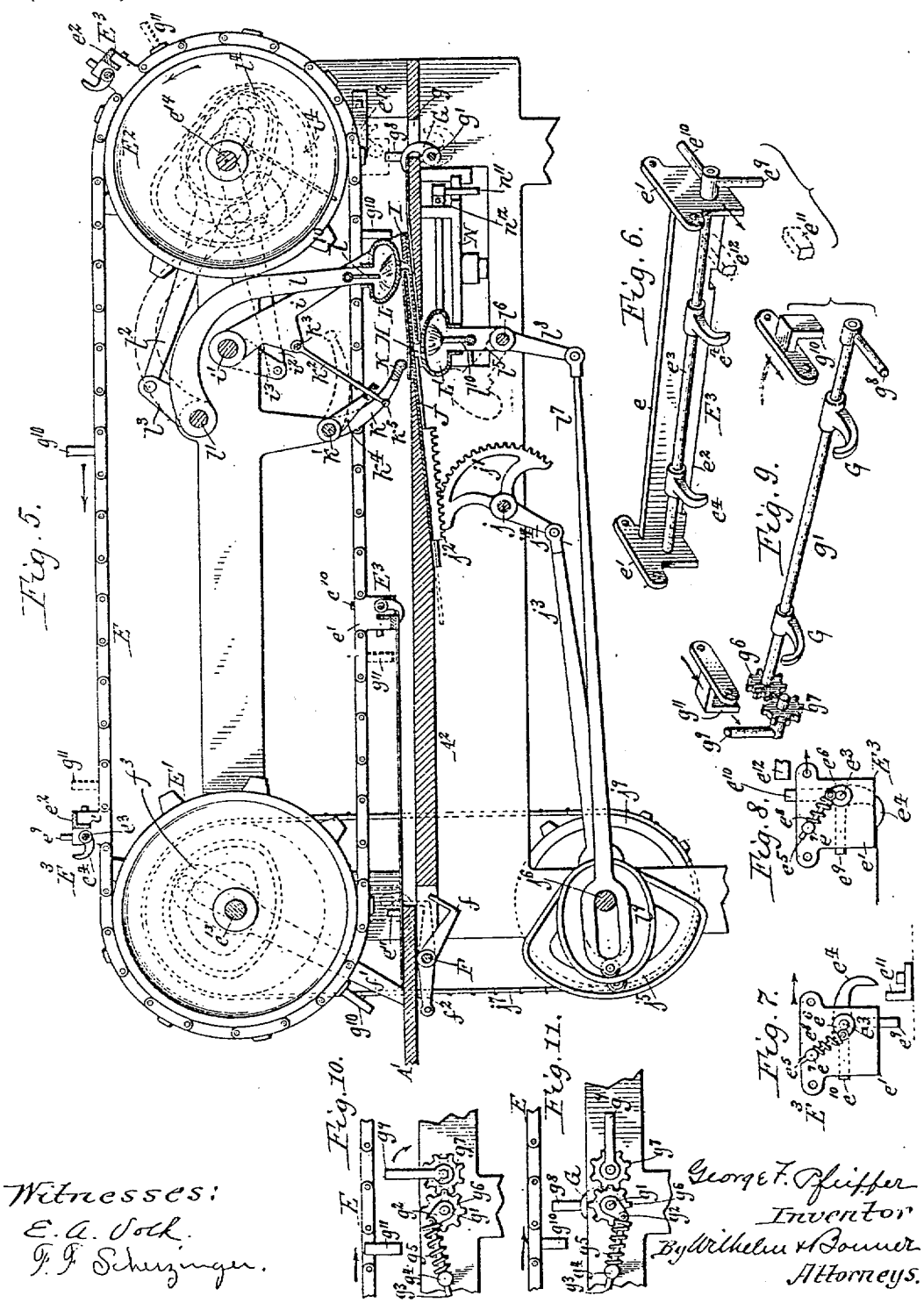

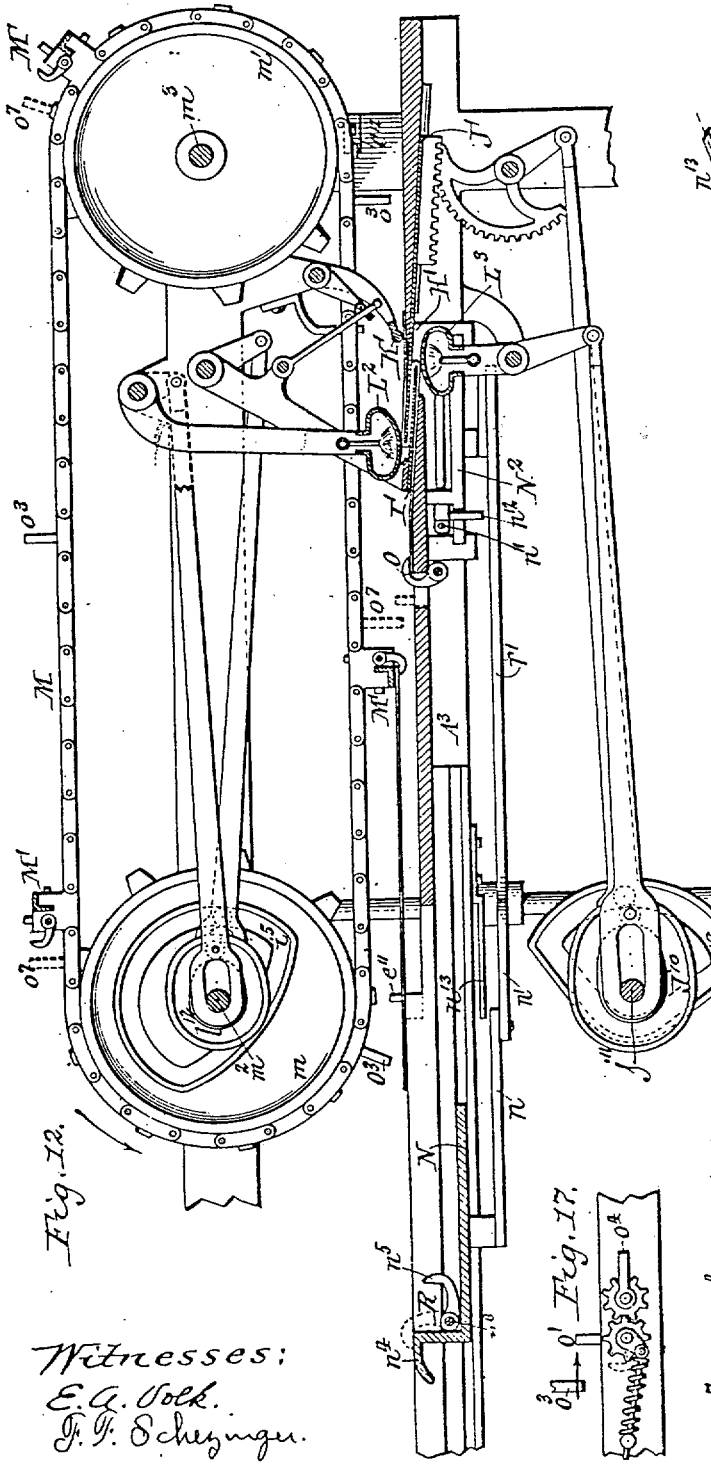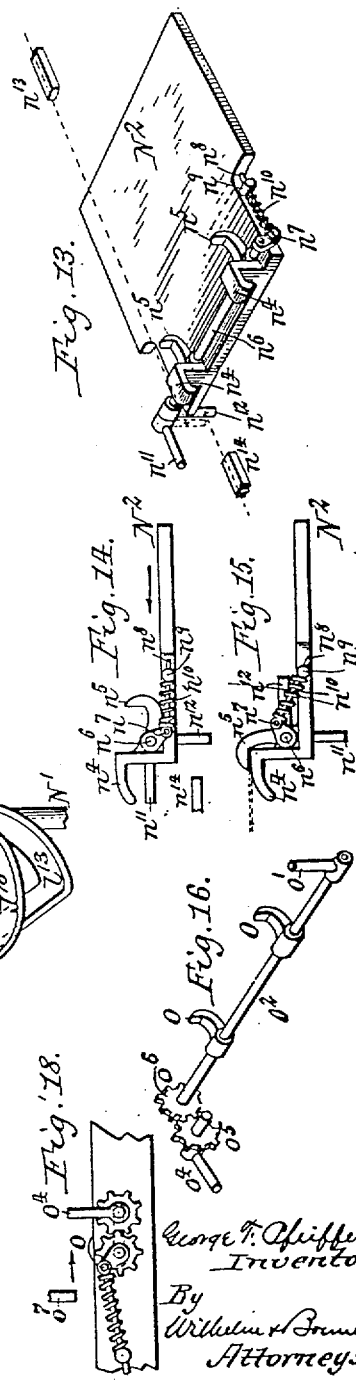

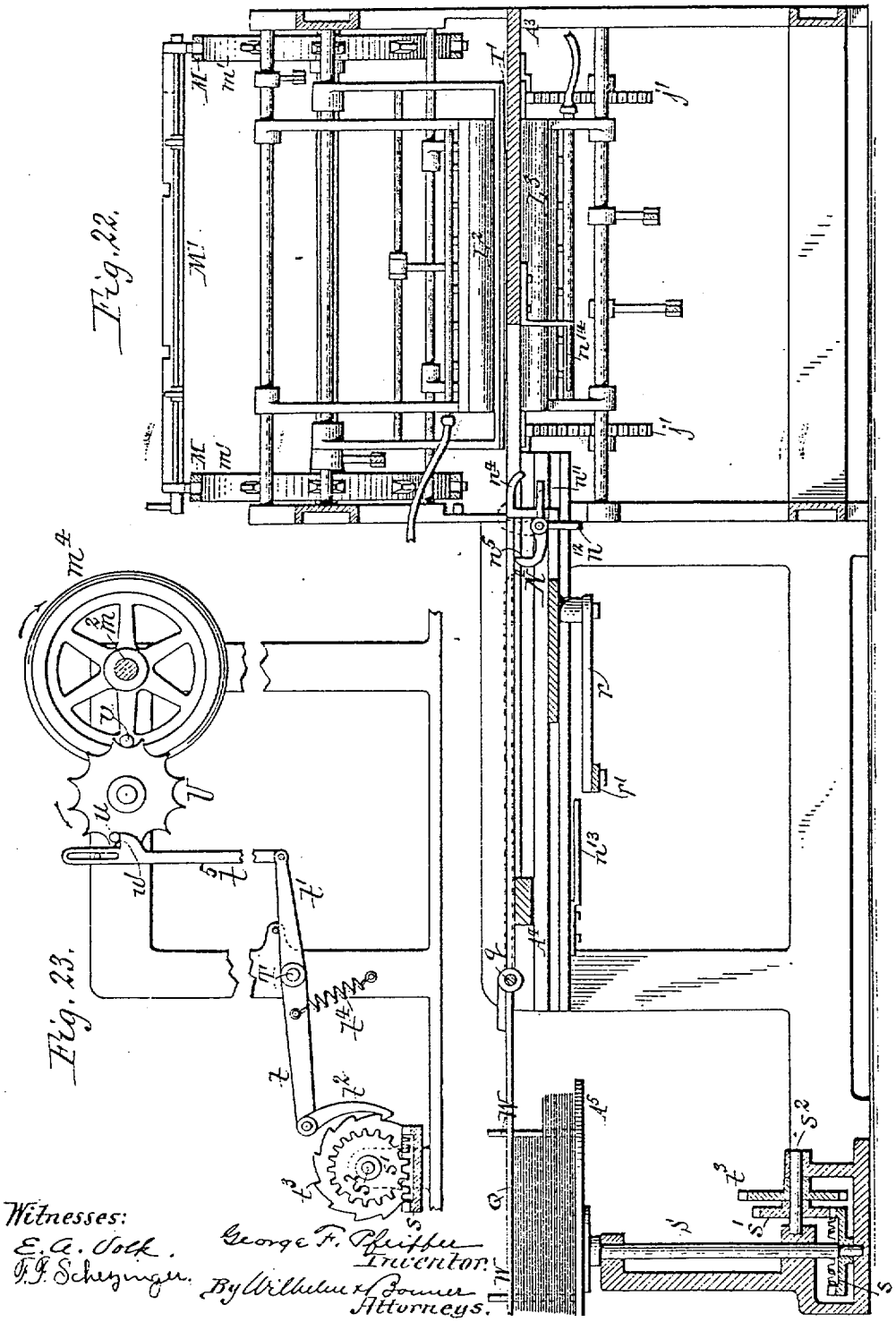

UNITED STATES PATENT OFFICE.

GEORGE F. PFEIFFER, OF BUFFALO, NEW YORK.

FOLDING-MACHINE.

SPECIFICATION forming part of Letters Patent No. 658,463, dated September 25, 1900.

Application filed July 25, 1899. Serial No. 725,098. (No model.)

*To all whom it may concern:*

Be it known that I, GEORGE F. PFEIFFER, a citizen of the United States, residing at Buffalo, in the county of Erie and State of New York, have invented new and useful Improvements in Folding-Machines, of which the following is a specification.

This invention relates to a machine for folding handkerchiefs and similar sheets or blanks, so that they can be packed closely for convenience in shipping and to improve their appearance.

The folding of handkerchiefs as practiced heretofore by hand consisted in first folding or doubling the handkerchief transversely upon itself across the center in one direction and then forming a second fold or double in the center of the handkerchief at right angles to the first fold.

The object of this invention is the production of a machine whereby the handkerchiefs are folded mechanically in the same manner in which they have heretofore been folded by hand and which will automatically stack the handkerchiefs in piles of a definite number, so as to facilitate packing of the handkerchiefs.

In the accompanying drawings, consisting of five sheets, Figure 1 is a top plan view of my folding-machine, partly in section. Fig. 2 is a front elevation of the pile-receptacle, in which the pile or supply of unfolded handkerchiefs is placed. Fig. 3 is a horizontal section in line 3 3, Fig. 2. Fig. 4 is a vertical section in line 4 4, Fig. 1. Fig. 5 is a fragmentary vertical section, on an enlarged scale, in line 5 5, Fig. 1, showing the mechanism whereby the first fold is produced in the handkerchief. Fig. 6 is a perspective view of one of the grippers, whereby the unfolded handkerchiefs are carried from the feed-table to the first folding mechanism. Fig. 7 is an end view of one of these grippers, showing the same open preparatory to receiving a handkerchief. Fig. 8 is a similar view showing the gripper closed upon a handkerchief. Fig. 9 is a perspective view of the retaining-gripper, whereby the handkerchief is held upon the first folding-table during the operation of producing the first fold in the same. Fig. 10 is a fragmentary side view of the mechanism for operating the handkerchief - retaining gripper, showing the position of the parts when the gripper is open. Fig. 11 is a similar view showing the position of the parts when this gripper is closed. Fig. 12 is a fragmentary vertical section, on an enlarged scale, in line 12 12, Fig. 1, showing the mechanism whereby the second fold is produced in the handkerchief. Fig. 13 is a perspective view of one of the transfer-grippers whereby the handkerchief is transferred from the first folding mechanism to the second folding mechanism and from the second folding mechanism to the stacking mechanism. Fig. 14 is a side elevation of one of the transfer-grippers, showing the same open preparatory to receiving the handkerchief. Fig. 15 is a similar view showing this gripper closed upon a handkerchief. Fig. 16 is a perspective view of the retaining-gripper, whereby the handkerchief is retained upon the second folding-table during the operation of producing the second fold in the handkerchief. Fig. 17 is a side view of the mechanism whereby this gripper is operated, showing the position of the parts when the gripper is open. Fig. 18 is a similar view showing the position of the parts when this gripper is closed. Fig. 19 is a fragmentary vertical section, on an enlarged scale, in line 19 19, Fig. 1, showing, essentially, the first folding mechanism and the transfer-gripper whereby the handkerchief is carried from the first folding mechanism to the second folding mechanism. Fig. 20 is a vertical section, on an enlarged scale, taken in line 20 20, Fig. 1, showing the mechanism for automatically raising the pile - supporting table as the handkerchiefs are fed off from the top of the pile. Fig. 21 is a fragmentary vertical section in line 21 21, Fig. 20. Fig. 22 is a vertical section, on an enlarged scale, taken in line 22 22, Fig. 1, showing the second folding mechanism and the stacking mechanism. Fig. 23 is a vertical section, on an enlarged scale, in line 23 23, Fig. 1.

Like letters of reference refer to like parts in the several figures.

A represents a pile-supporting table upon which the pile of unfolded handkerchiefs is placed and from the top of which the operator feeds the handkerchiefs one at a time toward the right and upon a horizontal feed-table A'. From the latter the operator feeds the handkerchiefs one at a time to the mechanism which produces the first fold in the handkerchief. The table A² of the first folding mechanism is arranged somewhat lower than the operator's feed-table and extends rearwardly from the rear end of the latter. The table A³ of the second folding mechanism is also arranged horizontally and somewhat lower than the first folding-table and extends at right angles from one side of the rear portion of the first folding-table, as shown in Fig. 1. From the second folding-table the handkerchiefs are carried to a delivery-table A⁴, which extends at right angles and forwardly from the rear end of the second folding-table.

A⁵ represents the stacking-table, upon which the folded handkerchiefs are delivered and which is arranged in front of the delivery-table.

The pile-supporting table A is arranged in an inclosing case B, which is open at the top, and the table is automatically raised as the handkerchiefs are fed off from the top thereof for the purpose of keeping the top of the pile within convenient reach of the operator by the following mechanism:

$b$ represents a horizontal screw-shaft which is journaled in bearings in the lower portion of the pile-case and which is provided on opposite sides of its longitudinal center with right and left hand screw-threads, as represented in Figs. 3, 20, and 21.

$b'$ $b'$ represent two cross-bars which are arranged transversely above opposite ends of the screw-shaft and each of which is provided centrally on its under side with a semi screw-nut $b^2$, engaging with the upper side of the adjacent threaded portion of the screw-shaft, so that by turning the screw-shaft in the proper direction the two cross-bars are moved toward each other lengthwise of the screw-shaft. The cross-bars rest with their opposite ends on guideways $b^3$, which are arranged lengthwise on the inner side of the pile-case on opposite sides of the screw-shaft and which support the cross-bars as the latter are moved toward and from each other.

C C represent two series of compound levers arranged in the lower portion of the pile-case and constructed to work on the principle of lazy-tongs, as represented in Figs. 2, 20, and 21. The ends of the lower pairs of these compound levers are pivoted to the opposite ends of the cross-bars $b'$ and the ends of the upper pairs of these levers bear against the under side of the pile-supporting table. Upon bringing the cross-bars together the compound levers are shifted so as to produce a vertical distention of the levers in a well-known manner, thereby raising the pile-supporting table and the handkerchiefs resting thereon, while upon separating the cross-bars the compound levers are contracted downwardly and the table resting thereon is lowered.

The screw-shaft $b$ is turned in the proper direction for slowly raising the pile-supporting table by a ratchet mechanism consisting, essentially, of a ratchet-wheel $c$, secured to one end of the screw-shaft, a pawl-arm $c'$, mounted loosely on said shaft and provided with a pawl $c^2$, engaging with the ratchet-wheel, as represented in Figs. 1 and 20. The pawl-arm may be reciprocated from any suitable source—for instance, from a rotating crank $c^3$, connected by a rod $c^4$ with the pawl-arm. For the purpose of permitting the pile-supporting table to be quickly lowered after the same has been raised the cross-bars $b'$ are lifted, with their screw-nuts, out of engagement with the screw-shaft, and in this position of the screw-nuts the table is depressed and the cross-bars are spread by the contraction and lowering of the compound levers. The cross-bars are then lowered, so that their screw-nuts again engage with the outermost portions of the screw-shaft. This lifting of the cross-bars is effected by two horizontal lifting-bars $d$, which are arranged lengthwise along the inner sides of the guideways and each of which is connected near opposite ends with the upper ends of rock-arms $d'$, as represented in Figs. 3, 20, and 21. The rock-arms of both lifting-bars are connected by rock-shafts $d^2$, and one of these rock-shafts is provided outside of the case with a treadle $d^3$. Upon depressing this treadle both lifting-bars are elevated along their whole length, and the cross-bars resting thereon are also lifted, so that their screw-nuts are disengaged from the screw-shaft. After the table has been shifted to the desired position the treadle is again released and the cross-bars engage with their screw-nuts into the thread of the screw-shaft by gravity.

The handkerchiefs are combed or feathered out by the operator from the top of the pile toward the right and upon the feed-table, so that each of the combed handkerchiefs is arranged slightly in advance of the next following or lower handkerchief. In order to facilitate this combing operation, the upper side of the pile-table is inclined toward the feed-table, as shown at $a$, Figs. 2 and 20, so that the pile resting thereon is tilted slightly toward the feed-table. The pile-case is provided with closed rear and side walls and with a removable front wall to permit the table to be conveniently loaded from the front side when in a depressed position. This front wall consists, preferably, of two doors B′, which are connected at their outer ends by hinges B² with the front ends of the side walls, so that the doors can be swung horizontally to one side and open up the front of the pile-case. The hinges of the doors are preferably provided with springs, which hold the doors in a closed position. The opposing free ends of the doors when in their closed position are separated by an intervening space B³, as shown in Figs. 1, 2, and 3, which permits the operator to observe the height of the pile, and thus serves as an indicator which informs the operator when the pile needs replenishing.

The handkerchiefs are carried from the feed-table rearwardly to the first folding mechanism by a carrier, which consists, essentially, of two endless carrying or chain belts E E, arranged lengthwise over the opposite longitudinal sides of the first folding-table and passing in the direction of the arrow around front and rear sprocket-wheels $E'$ $E^2$, as shown in Figs. 5 and 19. These sprocket-wheels are mounted, respectively, on horizontal shafts $e^{13}$ $e^{14}$, journaled in bearings on the main frame of the machine. The two belts are provided at suitable intervals with grippers $E^3$, which carry the handkerchiefs from the feed-table to the first folding mechanism, each of these grippers being constructed as follows:

$e$, Figs. 1, 5, 6, 7, and 8, represents a transverse bar which is connected at its ends by vertical hanger-plates $e'$ to the adjacent links of the two carrying-belts. This bar is provided on its outer side with a gripping-face $e^2$ and forms one of the jaws of the gripper.

$e^3$ represents a rock-shaft journaled transversely in the front portions of the hanger-plates $e'$ and provided with two or more fingers $e^4$, which form the other jaw of the gripper. In the open position of the gripper its fingers are swung forwardly and inwardly, as shown in Fig. 7, and in its closed position its fingers are swung outwardly and rearwardly against the cross-bar, and thereby grasp the handkerchief which is placed between the jaws. The gripper is yieldingly held either in an open or a closed position by a presser-rod $e^5$, pivoted at one end to a crank $e^6$ on one end of the gripper-shaft and passing loosely with its opposite end through a swiveling post $e^7$, which is pivoted on the adjacent hanger-plate, and a spring $e^8$, surrounding the presser-rod and bearing with its ends against the swiveling post and a shoulder on the presser-rod, as represented in Figs. 7 and 8. The pivotal connection between the presser-rod and the crank is such that when the gripper is open this connection is on one side of the dead-center and holds the gripper open, as shown in Fig. 7, and when the gripper-shaft is turned so that said pivotal connection is shifted to the opposite side of the dead-center, as shown in Fig. 8, the gripper will be held closed. The gripper-shaft is provided at its opposite end with two shifting-arms $e^9$ $e^{10}$, which are arranged at right angles to each other. These arms are adapted to engage, respectively, with stops or projections $e^{11}$ $e^{12}$, which are arranged on the main frame and whereby the gripper is either closed or opened. In the open position of the gripper its closing-arm $e^9$ projects outwardly or transversely with reference to the direction of movement of the gripper, and its opening-arm $e^{10}$ projects rearwardly and parallel with this direction of movement, as shown in Figs. 5 and 7. The operator places the handkerchief to be folded with its front edge transversely below the lowermost portions of the receiving sprocket-wheels. As an open gripper in moving downwardly and forwardly around the lower portion of the receiving sprocket-wheels reaches the front edge of the handkerchief its closing-arm $e^9$ engages with the closing-stop $e^{11}$ on the adjacent stationary part of the machine and its rock-shaft is turned sufficiently so that the pivotal connection between its crank and the presser-rod is carried to the opposite side of the dead-center, after which the closing movement of the gripper-fingers is completed quickly by the gripper-spring $e^8$ and the front edge of the handkerchief is grasped between the cross-bar and the fingers of the gripper. After the gripper has been closed upon the handkerchief its closing-arm $e^9$ projects rearwardly parallel with the line of movement of the gripper and its opening-arm $e^{10}$ projects inwardly transversely to the direction of movement of the gripper, as shown in Figs. 5 and 8. The gripper now moves forwardly in this position with the handkerchief until the handkerchief reaches the proper position with reference to the first folding mechanism, and then its outwardly-projecting opening-arm $e^{10}$ engages with the opening-stop $e^{12}$ on the adjacent stationary part of the frame, whereby the gripper-shaft is turned in the opposite direction. This movement of the shaft causes the pivotal connection between its crank and presser-rod to be shifted to the opposite side of the dead-center, after which the opening movement is quickly completed by the gripper-spring and the handkerchief is released from the gripper.

In order to enable the operator to always place the handkerchief with its front end in the proper position to be grasped by the gripper, a vertically-movable registering guide or stop is provided, which is elevated above the surface of the feed-table to permit the operator to gage the front end of the handkerchief against the same and which is depressed to permit the gripper to carry the handkerchief from the feed-table. This registering device preferably consists of two fingers $f$, which are secured with their front ends to a rock-shaft F, arranged below the feed-table, and which are adapted to move into and out of the path of the handkerchief at a point below the lowermost part of the receiving sprocket-wheels, the adjacent portion of the first folding-table being recessed for this purpose to permit the registering-fingers to partake of this movement, as represented in Figs. 1 and 5. The registering-fingers are raised and lowered at the proper time preferably by a connecting-rod $f'$, which is connected at its lower end with a forwardly-projecting arm $f^2$ on one end of the registering-shaft F and which is provided at its opposite end with a roller or projection engaging with a cam $f^3$, secured to the shaft of the receiving sprocket-wheels, as represented in Figs. 1 and 5.

After the handkerchief has been carried to the rear portion of the first folding-table and deposited thereon by the gripper in the proper position for receiving the first transverse fold the handkerchief after being released from the gripper is clamped along its front or advancing edge to the first folding-table, so that it is held against displacement during the first folding operation. This clamping device is constructed as follows:

G G, Figs. 1, 5, 9, and 10, represent two gripping jaws or fingers which pass up and down through openings $g$ in the rear portion of the first folding-table and which are secured at their lower ends to a rock-shaft $g'$, arranged transversely below the first folding-table. While the handkerchief is being carried rearwardly over the first folding-table the clamping-fingers G are swung rearwardly and downwardly, so as to clear the top of the table, as shown by dotted lines in Fig. 5, and when the handkerchief reaches its proper position to be folded on this table the clamping-fingers move upwardly and forwardly into engagement with the upper side of the handkerchief along the front edge thereof, whereby the latter is clamped against this folding-table. After the handkerchief has been folded the clamping-fingers are again swung rearwardly and downwardly to permit the folded handkerchief to be removed and permit the next unfolded handkerchief to be presented to the first folding mechanism. The clamping-fingers are yieldingly held in their open or closed position by a spring-tension device consisting of a crank $g^2$, secured to one end of the clamp-shaft $g'$, a presser-rod $g^3$, pivoted at one end to the crank and passing loosely with its opposite end through a swivel-post $g^4$, pivoted on the adjacent portion of the frame, and a spring $g^5$, surrounding the presser-rod and bearing with one end against said post and with its opposite end against a shoulder on the presser-rod, as represented in Figs. 10 and 11. The pivotal connection between the crank and the presser-rod is so located that it is shifted alternately from one side of the dead-center to the other side, and the spring thus serves to hold the clamp either in its open or closed position.

$g^6$ $g^7$ represent two intermeshing gear-wheels, one of which is secured to the clamp-shaft adjacent to its crank, and the other is pivoted to the adjacent portion of the main frame.

$g^8$ $g^9$ represent two shifting-arms whereby the clamping-fingers are shifted either into their open or closed positions. The opening-arm $g^8$ is secured to the opposite end of the clamp-shaft, and the closing-arm is secured to the gear-wheel $g^7$, which meshes with the gear-wheel $g^6$ on the clamp-shaft, as represented in Figs. 9, 10, and 11. The opening and closing arms of the clamping mechanism are arranged on opposite sides of the first folding-table and are adapted to be engaged by opening and closing lugs or tappets $g^{10}$ $g^{11}$, which are mounted on the carrying-belts E and arranged on the respective sides of the table. In the open position of the clamping device its closing-arm $g^9$ projects upwardly and its opening-arm $g^8$ projects forwardly with reference to the direction in which the lower portion of the carrying-belt moves, as represented in Figs. 9 and 10. When the handkerchief has been released from the carrying-gripper, the tappet $g^{11}$ engages with the front side of the closing-arm and moves the same rearwardly and downwardly, as represented in Fig. 11. This movement is transmitted by the gear-wheels $g^7$ $g^6$ to the clamp-shaft, whereby the latter is turned in the opposite direction, and its fingers are moved upwardly and forwardly. After the clamp-shaft has been turned sufficiently in this direction to bring the pivotal connection between its crank and the presser-rod to the opposite side of the dead-center of the pivotal connection this movement of the shaft is quickly completed by the spring $g^5$, and the clamping-fingers are thereby pressed against the front edge of the handkerchief. During the closing movement of the clamping-fingers the closing-arm is shifted from its vertical position into a rearwardly-projecting horizontal position and the opening-arm $g^8$ at the opposite end of the clamp-shaft is shifted from its rearwardly-projecting horizontal position into an upright position, as shown in Fig. 11, in which position of the opening-arm it stands in the path of the opening-tappet $g^{10}$ of the adjacent carrying-belt. The clamp remains in this closed position until the handkerchief which it grasps has been folded, and then the upwardly-projecting opening-arm $g^8$ on the opposite end of the clamp-shaft is engaged by the tappet $g^{10}$ on the adjacent carrying-belt, whereby the opening-arm is moved forwardly and downwardly, together with the clamping-fingers. When the clamp-shaft has been turned in this direction sufficient to carry the pivotal connection between its crank and the presser-rod to the opposite side of the dead-center of the pivotal connection, the opening movement is completed by the spring $g^5$ and the handkerchief is released. During this opening movement of the clamping-fingers the opening-arm $g^8$ is shifted from its vertical position to a forwardly-projecting horizontal position and the closing-arm $g^9$ is shifted from its forwardly-projecting horizontal position into an upright or vertical position, as represented in Figs. 9 and 10, in which position the closing-arm projects into the path of the closing-tappet $g^{11}$ on the adjacent carrying-belt ready to be engaged by this tappet for closing the clamping-fingers on the front end of the next handkerchief to be folded.

When the handkerchief is deposited by the carrying-gripper on the first folding-table in the proper position to be folded, it extends across a transverse slot H, which is arranged in the rear portion of this table and which divides this table into a front section and a rear section. The first fold is then produced in the handkerchief by a folding mechanism, which is constructed as follows:

I represents an upper folding-blade which presses the front portion of the handkerchief downward upon the rear section of the folding-table and over which the rear portion of the handkerchief is folded or doubled. The upper folding-blade is arranged transversely over the rear section of the table and is secured with its sides to the lower ends of rock-arms $i$. The upper ends of these arms are secured to a rock-shaft $i'$, which is journaled transversely in bearings on the main frame. This shaft is rocked for moving the upper folding-blade toward and from the table by means of a connecting-rod $i^2$, connected at one end with a rock-arm $i^3$ on the rock-shaft $i'$ and provided near its opposite end with a roller or projection which engages with a cam $i^4$, secured to the shaft $e^{14}$ of the delivery sprocket-wheels. In its depressed position the upper blade overhangs the rear edge of the slot H, and the handkerchief at this point is deflected downward slightly, for which purpose the rear section of the first folding-table is inclined toward the slot H, and the upper blade is correspondingly inclined, so as to bear flat against the rear section of the table when in its operative position.

J represents a lower folding-blade which is adapted to move upwardly through the slot H in the table and fold the rear portion of the handkerchief over the top of the upper blade. The lower blade slides lengthwise in guides on the under side of the front section of the folding-table and is inclined at the same angle as the upper blade; but its plane of movement is slightly above the upper blade when the latter is in its operative position. While the handkerchief is being laid across the slot H in the table the lower folding-blade is moved forwardly, so that its rear end is retracted below and in front of the slot in the table. After the front portion of the handkerchief has been clamped upon the rear section of the table the lower folding-blade is moved rearwardly, whereby its front or operative edge passes upwardly through the slot H and engages with the under side of the handkerchief. During the last part of the rearward movement of the lower blade the central part of the handkerchief is carried by the lower blade over the upper blade and folded or doubled in opposite directions around the opposing operative edges of the blades, as represented in Fig. 5. The reciprocating movement of the lower folding-blade may be effected by various means—for instance, as shown in Fig. 5, by a rock-shaft $j$, provided with gear-segments $j'$, engaging with gear-racks $j^2$ on the lower blade, and a connecting-rod $j^3$, which is connected at its rear end with a depending arm $j^4$ on the segment-shaft and which is provided at its front end with a projection or roller engaging with a cam $j^5$. The latter is mounted upon a transverse shaft $j^6$, which is journaled transversely on the main frame below the first folding-table and which is driven by a chain belt $j^7$, passing around sprocket-wheels $j^8 j^9$, secured, respectively, to the shaft $e^{13}$ of the receiving sprocket-wheels and the cam-shaft $j^6$, as represented in Figs. 1 and 5.

K represents a smoothing or retaining bar which is adapted to press the rear portion of the handkerchiefs loosely down upon the front section of the folding-table and spread the same evenly while the same is being folded, thereby preventing the handkerchief from becoming wrinkled or displaced during the folding operation. This smoothing-bar, as shown in Figs. 1 and 5, is secured at its ends to the lower ends of two hangers or arms $k$, which are rigidly secured at their upper ends on a transverse shaft $k'$. This shaft is journaled in the adjacent portion of the main frame and is rocked for moving the smoothing-bar toward and from the folding-table by means of a connecting-rod $k^2$, which is secured at its upper end to a cross-bar $k^3$, connecting the arms of the upper blade, and which is loosely connected at its lower end to a depending arm $k^4$ on the rock-shaft of the smoothing-bar. This loose connection is preferably formed by passing the connecting-rod $k^2$ loosely through the depending arm and arranging a head or shoulder $k^5$ on the rod below the arm $k^4$. The relative position of the smoothing-bar and the upper folding-blade is such that when the blade moves downwardly the smoothing-bar bears against the rear portion of the handkerchief slightly in advance of the blade, and during the balance of the downward movement of the blade, after the smoothing-bar rests upon the handkerchief, the connecting-rod $k^2$ slides through the depending arm $k^4$. During the subsequent upward movement of the blade the latter moves slightly upward independent of the smoothing-bar, and then the head of the connecting-rod $k^2$ bears against the under side of the depending arm $k^4$, which causes the smoothing-bar to be lifted from the handkerchief, together with the blade. By thus loosely connecting the upper folding-blade with the smoothing-bar the latter bears upon the handkerchief only with its weight, which is sufficient to take out the wrinkles, but does not retard the movement of the handkerchief while being folded.

L L' represent two sad-irons or smoothing-irons which are arranged above and below the folding-table, as represented in Figs. 1, 5, and 19, and whereby the bends which are formed in the handkerchief around the edges of the folding-blades are set or creased, so that the handkerchief tends to remain in its folded condition. The upper sad-iron is secured to the lower ends of two rock-arms $l\ l$, which latter are secured at their upper ends to a transverse rock-shaft $l'$, journaled in the adjacent portion of the main frame. This rock-shaft is operated for moving the upper sad-iron toward and from the rear end of the lower folding-blade, when the latter is in an operative position, by a connecting-rod $l^2$, which is connected at its front end to a rock-arm $l^3$ on the upper sad-iron shaft and which is provided on its rear end with a lug or roller which engages a cam $l^4$, mounted on the shaft $e^{14}$ of the rear sprocket-wheels $E^2$. The lower sad-iron $L'$ is supported at its ends by arms $l^5$ on a rock-shaft $l^6$, and the latter is operated for moving the lower sad-iron $L'$ toward and from the front edge of the upper folding-blade, when the latter is in its operative position, by a connecting-rod $l^7$, which is connected at its rear end to an arm $l^8$, depending from the lower sad-iron shaft, and which is provided at its front end with a lug or roller engaging with a cam $l^9$ on the transverse shaft $j^6$. Each of the sad-irons is preferably made hollow and is heated, so as to make the crease in the handkerchief more permanent, by means of a number of gas jets or burners $l^{10}$, which are mounted on the supporting-arms of the sad-irons and to which the gas or other fuel is supplied by means of a flexible tube $l^{11}$, which connects with the pipe carrying the jets or burners, as shown in Fig. 19.

Before the gripper carrying an unfolded handkerchief reaches the first folding mechanism the sad-irons, the folding-blades, and the smoothing-bar are all retracted, as shown by dotted lines, Fig. 5, in which position the upper sad-iron, the upper folding-blade, and the smoothing-bar are lifted above the path of the gripper and the lower sad-iron and folding-blade are moved forwardly from underneath the slot H in this folding-table. While the folding mechanism is in this position the gripper carries the unfolded handkerchief upon the rear portion of the folding-table and deposits the same across the slot H and within reach of the clamping-fingers G, which latter grasp the same. The upper folding-blade, together with the smoothing-bar, is now lowered upon the handkerchief on opposite sides of the slot H, and then the lower folding-blade is advanced and the rear portion of the handkerchief is lapped over the upper blade, during which operation the trailing portion of the handkerchief is drawn along the under side of the smoothing-bar. The sad-irons now both advance and simultaneously crease the upper and lower bends around the opposing ends of the folding-blades and are then both retracted, after which the lower folding-blade, the upper folding-blade, and the smoothing-bar are also successively retracted in the order named. After the handkerchief has received its first fold in the manner described its front end is released by the clamping-fingers G, and it is carried laterally upon the second folding-table and presented to the second folding mechanism, whereby a second fold is produced in the handkerchief at right angles to the first fold.

The carrying mechanism which presents the partly-folded handkerchief to the second folding mechanism is constructed substantially the same as the carrying mechanism which presents the unfolded handkerchief to the first folding mechanism and consists, essentially, of two carrying belts or chains M M, which pass around receiving and delivery sprocket-wheels $m\ m'$ and grippers $M'$, which are arranged on the carrying-belts at suitable intervals. These grippers are constructed and operated precisely the same as the grippers of the first carrier, and the same letters of reference therefore apply to the corresponding parts of the grippers of both carriers. The receiving and delivery sprocket-wheels are mounted on front and rear shafts $m^2\ m^3$ similar to the first carrier, and the front shaft extends forwardly and is geared with the front shaft of the first carrier by intermeshing miter gear-wheels $m^4\ m^5$, as shown in Fig. 1, whereby the two carriers are operated in unison. The shaft $m^2$ also carries the crank $c^3$, which operates the pile-raising mechanism. After the handkerchief has been released from the first folding mechanism the same is carried laterally at right angles within reach of the grippers of the second carrier by a transfer device, and when the handkerchief is released from the second folding mechanism the handkerchief is carried from the second folding mechanism to the delivery mechanism by a second transfer device. The construction and operation of these two transfer devices are identical, with the exception that in one the gripper-operating mechanism is arranged reversely to that of the other, and the description of one will therefore apply to both.

N, Figs. 5 and 19, represents the reciprocating slide of the first transfer device, which is arranged in guides underneath the receiving portion of the second folding-table and which has a movement at right angles to the first handkerchief-carrier and parallel with the second carrier. This slide is operated from a vertical rock-shaft $N'$ by means of a link $n$, connecting the lower side of the slide with a horizontal rock-arm $n'$ on the rock-shaft $N'$. This shaft is operated by means of a cam $n^2$, mounted on the shaft $m^2$ and engaging with an arm $n^3$ on the rock-shaft $N'$, as shown in Fig. 1. The slide is provided with two fixed jaws $n^4$, which project upwardly through longitudinal slots in the folding-table and which are provided at their upper ends with gripping-faces arranged flush, or nearly so, with the top of the folding-table.

$n^5$ represents two gripper-fingers which are arranged in the slots in rear of the jaws $n^4$ and which are secured to a transverse rock-shaft $n^6$, journaled on the adjacent portion of the slide. In the open position of the gripper of the transfer device its gripper-fingers are swung rearwardly and downwardly, so as to clear the top of the table, as shown in Figs. 12, 13, 14, and 19, and in the closed position of this gripper the gripper-fingers are swung upwardly and forwardly, so as to bear against the gripping-surface of the transfer-jaws, as represented by dotted lines in Figs. 12 and 19 and in full lines in Fig. 15. The gripping-fingers are yieldingly held either in their open or closed position by a crank $n^7$, secured to one end of the transfer-gripper shaft, a presser-rod $n^8$, pivotally connected at one end to said crank and sliding with its opposite end in a swiveling-post $n^9$, which is pivoted to the adjacent portion of the slide, and a spring $n^{10}$, surrounding the presser-rod and bearing with one end against said post and with its opposite end against a shoulder on the presser-rod, as represented in Figs. 14 and 15. Upon turning the gripper-shaft so that the pivotal connection between its crank and the presser-rod is shifted from one side to the other the spring serves to hold the gripper-fingers in either extreme position of the fingers. The opposite end of the transfer-gripper shaft is provided with a gripper-opening arm $n^{11}$ and a gripper-closing arm $n^{12}$, these arms being arranged at right angles to each other and out of line lengthwise of the axis of the shaft, as shown in Figs. 5 and 13. The main frame of the machine is provided with two stops $n^{13}$ $n^{14}$, which are adapted to engage alternately with the gripper opening and closing arms for the purpose of turning the shaft so as to open or close the gripper. In the open position of the gripping-fingers the closing-arm $n^{12}$ extends downwardly in line with the closing-stop $n^{14}$ and the opening-arm $n^{11}$ projects forwardly from the shaft, as represented in Figs. 13 and 14. While the gripper is in this position it is moved backwardly or toward the side of the partly-folded handkerchief, as indicated by the arrow in Fig. 19. During the last portion of this backward movement of the transfer-gripper its fixed jaws pass underneath the adjacent edge of the partly-folded handkerchief and its closing-arm $n^{12}$ engages with the closing-stop $n^{14}$, whereby the shaft of this gripper is turned in the direction for closing the gripper-fingers. When this shaft has been turned sufficiently to carry its crank to the opposite side of the dead-center, its spring quickly completes the closing movement of the gripper-fingers, so that they grasp the edge of the handkerchief which is lying upon the fixed jaws. In this shifted position of the grippers the closing-arm $n^{12}$ projects horizontally forward and the opening-arm $n^{11}$ projects downwardly, as represented in Fig. 15. The transfer-gripper, together with the handkerchief grasped thereby, removes the partly-folded handkerchief from the first folding-table. When the transfer-gripper reaches a position below the lowermost portion of the receiving sprocket-wheels $m$ of the second carrier, its opening-arm $n^{11}$ engages with the opening-stop $n^{13}$, whereby the transfer-gripper shaft is turned in the direction for opening the gripper. When this shaft has been turned sufficiently in this direction to carry the pivotal connection between its crank and the presser-rod slightly beyond the dead-center, this movement is quickly completed by the spring and the gripper is opened fully for releasing the handkerchief. At the same time, or nearly so, that the handkerchief is released from the transfer-gripper the same is grasped by one of the grippers M′ of the second carrier and then carried forwardly and laid across the slot H′, which divides the second folding-table into front and rear sections in the same manner in which the unfolded handkerchief is presented to the first folding mechanism. After the blank has been deposited upon the second folding-table in the proper position to be folded its trailing end is grasped by a pair of clamping-fingers O, which are operated in substantially the same manner as the clamping-fingers which grasp the advancing end of the unfolded handkerchief on the first folding-table, with the exception that the arrangement of the opening and closing arms of the operating mechanism is arranged reversely, as shown in Figs. 12, 16, 17, and 18. In the open position of the second clamping device the closing-arm O′ is secured to the clamping-finger shaft $o^2$ and projects upwardly into the path of its operating-tappet $o^3$ on the adjacent belt, while the closing-arm $o^4$ projects forwardly and is secured to the gear-wheel $o^5$, which meshes with the gear-wheel $o^6$ on the clamping-finger shaft $o^2$, as represented in Figs. 16, 17, and 18. When the second clamping device is closed, its closing-arm $o′$ projects forwardly and its opening-arm $o^4$ projects upwardly into the path of its operating-tappet $o^7$ on the adjacent belt, as represented in Fig. 18.

The second folding mechanism, which produces the second fold in the handkerchief while the latter lies on the second folding-table, as shown in Figs. 12 and 22, is constructed substantially the same as the first folding mechanism, the essential difference being that the second folding mechanism is arranged to operate reversely to the first folding mechanism. The upper folding-blade I′ of the second folding-table bears upon the trailing portion of the handkerchief, and its companion lower folding-blade J′ folds the advancing end of the handkerchief backwardly over the upper blade. The cams $i^5 l^{12}$, which operate the upper blade I′, smoothing-bar K′, and upper sad-iron L² of the second folding mechanism, are mounted on the shaft $m^2$. The lower folding-blade J′ and lower sad-iron L³ of the second folding mechanism are arranged below the rear section of the second folding-table, and their cams $j^{10} l^{13}$ move the same forwardly when in operation.

As shown in the drawings, the shaft $m^3$ of the delivery sprocket-wheels of the second carrier is employed as the main driving-shaft, which is provided with a pulley P, to which a driving-belt is applied in the usual manner. The shaft $j^{11}$, supporting the cams $j^{10} l^{13}$, which operate the lower sad-iron L³ and the lower folding-blade J′, is rotated by means of a chain belt $p$, passing around sprocket-wheels $p'$ $p^2$, mounted, respectively, on the driving-shaft $m^3$ and the cam-shaft $j^{11}$.

After the second fold has been produced in the handkerchief the same is carried laterally by the second transfer device from the second folding-table and delivered upon a set of pivoted discharge-flies Q, which are arranged upon the delivery-table $A^4$. The slide $N^2$ of the second transfer device is guided in ways on the under side of the delivery-table $A^4$, and its fixed jaws $n^4$ project upwardly through slots in the delivery-table. This slide is operated from the vertical rock-shaft $N'$ by a link $r$, connecting this slide with a rock-arm $r'$ on said shaft in the same manner in which the first transfer-slide is operated.

The pivoted flies Q, which receive the folded handkerchiefs, operate in the same manner as the flies of a printing-press and serve to carry the folded handkerchief from the delivery-table $A^4$ to the receiving or stacking table $A^5$, arranged in rear of the delivery-table. These flies are mounted on a transverse shaft $q$, which is pivoted transversely near the rear end of the delivery-table and are moved backwardly, so as to lie horizontally on the delivery-table, as shown by dotted lines in Figs. 1 and 22, by means of a cord or strap $q'$, which is wound with one end upon a drum $q^2$ on said shaft and which is connected at its opposite end to a crank $q^3$, as shown in Figs. 1 and 4. This crank is mounted upon a bevel gear-wheel $q^4$, which meshes with a corresponding bevel gear-wheel $q^5$ on the adjacent end of the driving-shaft $m^3$. While the flies are resting upon the delivery-table the second transfer device carries the folded handkerchiefs from the second folding-table over the flies and then releases the same. The flies are then swung upwardly and rearwardly, as shown by full lines in Figs. 1 and 22, so as to deposit the folded handkerchief upon the receiving-table. This movement of the flies is produced by a spring $q^6$, surrounding the fly-shaft and secured at one end to the drum and with its opposite ends to the adjacent stationary part of the machine. During the subsequent return movement of the flies this spring is strained preparatory to effecting the next forward movement of the flies.

In order to facilitate bundling of the handkerchiefs, the receiving-table is given a partial turn whenever a predetermined number of handkerchiefs have been delivered upon the same. By this means the handkerchiefs are piled upon the table in such manner that each bundle is arranged at an angle to the adjacent bundles, as shown in Fig. 1, which enables the operator to remove the handkerchiefs and pack the same without the necessity of counting them over.

The mechanism for automatically turning the stacking-table, which is shown in the drawings, is organized for piling the handkerchiefs in stacks or bundles of a dozen each and is constructed as follows:

S represents an intermittently-rotating vertical shaft which supports the receiving-table $A^5$ at its upper end, as represented in Fig. 22. This shaft is provided at its lower end with a gear-wheel $s$, which meshes with a gear-wheel $s'$, secured to a short horizontal shaft $s^2$.

T represents a rock-shaft provided with two rock-arms $t$ $t'$, projecting in opposite directions. The rock-arm $t$ carries a pawl $t^2$, which engages with a ratchet-wheel $t^3$ on the horizontal shaft $s^2$. The rock-shaft is moved backwardly for taking up a new tooth on the ratchet-wheel by a spring $t^4$ connecting with the rock-arm $t$. The opposite arm $t'$ of the rock-lever is provided with an upwardly-projecting shifting rod or bar $t^5$, which is guided on the adjacent part of the frame.

U represents a star-wheel provided with twelve teeth and with a tooth or tappet $u$, which is adapted to engage with a shoulder $u'$ on the shifting rod $t^5$, as represented in Fig. 23. The adjacent gear-wheel $m^4$ is provided with a tooth or tappet $v$, adapted to engage with the teeth of the star-wheel. The shaft $m^2$ makes one revolution for every handkerchief which is folded and delivered upon the receiving-table, and during each revolution its tooth or tappet $v$ engages one of the teeth of the star-wheel and turns the same one-twelfth of a rotation, so that when this shaft has made twelve turns the star-wheel has made one complete turn. During the last twelfth of a turn of the star-wheel its tooth or tappet engages with the shoulder of the shifting rod $t^5$ and depresses the same, thereby turning the rock-shaft, so that the pawl shifts the ratchet-wheel and the receiving-table geared therewith. As shown in the drawings, this gearing is so timed that the receiving-table is turned one-eighth of a rotation whenever twelve handkerchiefs have been deposited upon the same; but, if desired, the extent of rotation of the receiving-table may be varied.

In order to secure a perfect alinement of the handkerchiefs on the receiving-table $A^5$, the latter is provided with a number of upright guide-posts W, between which the handkerchiefs are deposited and held in place, so that the bundles do not require any further attention before being tied.

The operation, briefly stated, of my handkerchief-folding machine is as follows: After placing a pile of unfolded handkerchiefs upon the pile-supporting table A the operator combs the top of the pile toward the right upon the feed-table $A'$, and then takes the uppermost handkerchief and places the same, with its front edge, against the front guides $f$, which at this time are elevated. As the next following gripper $E^3$ of the first carrier approaches the front end of the registered handkerchief the front guide $f$ descends below the feed-table, and then the passing gripper grasps the front end of the handkerchief and carries the same forwardly over the first folding table. When the handkerchief has reached the folding position with reference to the first folding mechanism, the moving gripper releases the same, and then the first clamping device G grasps the front end of the handkerchief and holds the same in place upon the table. The first folding and ironing devices now operate upon the handkerchief for producing the first fold in the same, after which these folding and ironing devices and the first clamp are disengaged from the handkerchief and the same is left perfectly free. The partly-folded handkerchief is now seized by the first transfer device and delivered to the next following gripper M' of the second carrier, which is at this time in the proper place to grasp the same, and the transfer device is disengaged from the handkerchief. The latter is now carried by the gripper M' of the second carrier into the proper position upon the second folding-table, so as to be grasped at its rear end by the second clamping device O, and it is then released by the gripper M'. The folding and ironing devices of the second folding-table now operate upon the handkerchief to produce the second fold therein, after which these parts clear this handkerchief, so as to leave the same perfectly free to be carried laterally by the second transfer device to the delivery-flies, and then the latter deposit the completely-folded handkerchief on the receiving-table $A^5$. When the machine is fully in operation, an unfolded handkerchief is registered and propelled by the first carrier, another handkerchief is receiving its first fold, another handkerchief is being propelled by the second carrier, another handkerchief is receiving its second fold, and still another is being delivered upon the pile-receiving table, so that several handkerchiefs are simultaneously undergoing the operations of being registered, receiving the first fold, receiving the second fold, and being delivered upon the pile-receiving table.

I claim as my invention—

1. The combination with a folding-table provided with a slot, of an upper folding-blade having a movement toward and from the top of the table on one side of its slot and adapted to press one end of the sheet against the table, and a lower folding-blade arranged below said table on the opposite side of its slot and adapted to move upwardly through said slot and over the upper folding-blade, whereby the central part of the sheet is folded or doubled around the opposite ends of said blades, substantially as set forth.

2. The combination with a folding-table provided with a slot, of an upper folding-blade having an oscillating movement toward and from the top of the table on one side of its slot, and a lower folding-blade arranged below the table on the opposite side of its slot and having a reciprocating movement through said slot and over the upper folding-blade, substantially as set forth.

3. The combination with a folding-table provided with a slot, of an upper folding-blade adapted to bear upon the table on one side of its slot, a rock-shaft carrying the upper folding-blade, a cam which operates said rock-shaft, a lower folding-blade arranged on guideways below the table on the opposite side of its slot and having a reciprocating movement through said slot and over the upper folding-blade, gear-segments meshing with gear-racks on the lower folding-blade, and a cam which operates the segments, substantially as set forth.

4. The combination with a folding-table provided with a slot, of an upper folding-blade adapted to bear against the top of the table on one side of its slot, a smoothing-bar adapted to bear against the top of the table on the opposite side of its slot, and a lower folding-blade arranged below the table and adapted to pass through said slot and over the upper folding-blade, substantially as set forth.

5. The combination with a folding-table provided with a slot, of an upper folding-blade adapted to bear against the top of the table on one side of its slot, a smoothing-bar adapted to bear against the top of the table on the opposite side of its slot, and loosely connected with the operating device of the upper folding-blade and a lower folding-blade arranged below the table and adapted to pass through said table and over the upper folding-blade, substantially as set forth.

6. The combination with a folding-table provided with a slot, of an upper folding-blade mounted on a rocking support and adapted to bear against the top of the table on one side of its slot, a smoothing-bar supported by a rock-shaft and adapted to bear against the top of the table on the opposite side of its slot, a rock-arm connected with said shaft, a rod passing loosely through said arm and provided with a head at its lower end and connected at its upper end with said rocking support, and a lower folding-blade arranged below the table and adapted to pass through said slot and over the upper folding-blade, substantially as set forth.

7. The combination with a folding-table, of two folding-blades which are adapted to overlap one another and fold the sheet between the same, and sad-irons adapted to engage with the sheet at the opposing ends of the folding-blades, substantially as set forth.

8. The combination with a folding-table, of two folding-blades which are adapted to overlap one another and fold the sheets between the same, and a clamp adapted to grasp the end of the blank and hold the same during the folding operation, substantially as set forth.

9. The combination with a folding-table provided with a slot, of an upper oscillating folding-blade adapted to bear against the top of the table on one side of its slot, a smoothing-bar adapted to bear against the top of the table on the opposite side of the slot, a lower reciprocating folding-blade arranged below the table and adapted to pass through said slot and over the upper folding-blade, a clamp adapted to grasp the end of the sheet which is being folded, and upper and lower sad-irons adapted to engage with the opposing ends of the folding-blades, substantially as set forth.

10. The combination with the folding mechanism, of an endless carrier, a gripper having a jaw which is fixed on said carrier, a movable jaw which is mounted on a rock-shaft turning on the carrier, a spring bearing against a crank on one end of said shaft, gripper closing and opening arms arranged on said rock-shaft, and stationary stops which are engaged by the closing and opening arms for shifting the latter, substantially as set forth.

11. The combination with the folding-table and the folding mechanism, of a carrier whereby the sheets are carried to the folding mechanism, clamping-fingers adapted to engage with the end of the sheet and mounted on a rock-shaft, a shifting-arm arranged on the rock-shaft, a gear-wheel meshing with a gear-wheel on said rock-shaft and provided with a shifting-arm which is arranged at an angle to the shifting-arm on said rock-shaft, and tappets arranged on said carrier and adapted to engage with said shifting-arms for opening and closing the clamping-fingers, substantially as set forth.

12. The combination with the folding-table and the folding mechanism, of a carrier whereby the sheets are carried to the folding mechanism, clamping-fingers adapted to engage with the end of the sheet and mounted on a rock-shaft, a shifting-arm arranged on the rock-shaft, a gear-wheel meshing with a gear-wheel on said rock-shaft and provided with a shifting-arm which is arranged at an angle to the shifting-arm on said rock-shaft, tappets arranged on said carrier and adapted to engage said shifting-arms for opening and closing the clamping-fingers, and a spring which engages with a crank on said shaft and whereby the clamping-fingers are yieldingly held in an open or closed position, substantially as set forth.

13. The combination with the folding mechanism, of a transfer-gripper having a movement toward and from the folding mechanism and consisting of a slide, jaws fixed on the slide, movable jaws mounted on a rock-shaft which is journaled on said slide, a spring which engages with a crank on the shaft and holds the same yieldingly in an open or closed position, and two shifting-arms arranged at right angles to each other on said rock-shaft and adapted to engage with stops for turning the rock-shaft in opposite directions, substantially as set forth.

14. The combination with a feed-table, a primary folding-table and a secondary folding-table, said several tables being all arranged substantially in the same plane, of a primary carrier which carries the sheet to be folded from the feed-table to the primary folding-table, a primary transferring device which carries the sheet away from the first folding-table, a secondary carrier which carries the sheet from the primary transferring device to the secondary folding-table, and a secondary transferring device which carries the sheet away from the secondary folding-table, substantially as set forth.

Witness my hand this 17th day of July, 1899.

GEORGE F. PFEIFFER.

Witnesses:
 THEO. L. POPP,
 HENRY L. DECK.